(12) United States Patent
Burrowes et al.

(10) Patent No.: US 10,458,573 B2
(45) Date of Patent: Oct. 29, 2019

(54) HIGH PRESSURE COMPACT SPIRAL HYDRAULIC HOSE

(71) Applicant: ContiTech USA, Inc., Fairlawn, OH (US)

(72) Inventors: Anh Burrowes, North Canton, OH (US); Craig Boche, Norfolk, NE (US); John Anthony Brookes, Chorley (CN); Robert Kozak, Burlington, IA (US); Jenny Yu, Akron, OH (US)

(73) Assignee: ContiTech USA, Inc., Fairlawn, OH (US)

( * ) Notice: Subject to any disclaimer, the term of this patent is extended or adjusted under 35 U.S.C. 154(b) by 243 days.

(21) Appl. No.: 15/483,770

(22) Filed: Apr. 10, 2017

(65) Prior Publication Data

US 2018/0292030 A1    Oct. 11, 2018

(51) Int. Cl.
*F16L 11/00* (2006.01)
*F16L 11/08* (2006.01)
*B32B 1/08* (2006.01)

(52) U.S. Cl.
CPC .............. *F16L 11/083* (2013.01); *B32B 1/08* (2013.01); *F16L 11/082* (2013.01)

(58) Field of Classification Search
CPC .............................. F16L 11/083; F16L 11/082
USPC .................. 138/126, 127, 130, 133
See application file for complete search history.

(56) References Cited

U.S. PATENT DOCUMENTS

| 3,212,528 A | 10/1965 | Haas |
| 4,688,605 A * | 8/1987 | Eisenzimmer ........ F16L 11/082 138/130 |
| 4,905,734 A | 3/1990 | Ito |
| 4,905,735 A | 3/1990 | Akiyoshi |
| 4,998,564 A | 3/1991 | Igarashi et al. |
| 5,957,164 A | 9/1999 | Campbell |
| 7,143,789 B2 | 12/2006 | Nagy et al. |
| 8,539,985 B2 | 9/2013 | Weil et al. |
| 2002/0100516 A1 * | 8/2002 | Powell ..................... D04C 1/02 138/125 |
| 2002/0144743 A1 * | 10/2002 | Daikai .................... B32B 25/10 138/126 |

(Continued)

OTHER PUBLICATIONS

International Search Report dated Jul. 4, 2018 of international application PCT/US2018/023533 claiming priority on this application.

*Primary Examiner* — James F Hook

(74) *Attorney, Agent, or Firm* — David L. Cate

(57) ABSTRACT

A hose includes an inner tube defining a central longitudinal axis there through, and is formed of a vulcanized rubber and a plurality of rod shaped particles orientated substantially parallel with the central longitudinal axis, along with other typical materials. The inner tube has a tube wall thickness (t) of between about 0.5 mm to about 1.5 mm, and the plurality of rod shaped particles is incorporated in an amount of 10% or less by weight. The hose further includes a tie layer directly surrounding the inner tube, a first reinforcement layer surrounding the tie layer, and at least a second reinforcement layer surrounding the first reinforcement layer. An interlayer is interposed between the first and the second reinforcement layer, and the interlayer bonds the first reinforcement layer to the second reinforcement layer. An outside cover surrounds the second reinforcement layer, as well as any additional layers.

21 Claims, 2 Drawing Sheets

(56) References Cited

U.S. PATENT DOCUMENTS

| | | |
|---|---|---|
| 2003/0188793 A1 | 10/2003 | Kanbe et al. |
| 2006/0011250 A1 | 1/2006 | Ikemoto et al. |
| 2006/0127620 A1 | 6/2006 | Fisher |
| 2006/0151043 A1 | 7/2006 | Nanney |
| 2010/0160539 A1* | 6/2010 | Sasaki ................... C09C 1/54 |
| | | 524/577 |
| 2011/0168272 A1 | 7/2011 | Weil et al. |
| 2014/0153986 A1* | 6/2014 | Muramatsu ........ G03G 15/2057 |
| | | 399/333 |
| 2014/0202574 A1* | 7/2014 | Thomson ................. F16L 1/15 |
| | | 138/125 |
| 2014/0251532 A1 | 9/2014 | Sarkar |

* cited by examiner

HIGH PRESSURE COMPACT SPIRAL HYDRAULIC HOSE

FIELD

The field to which the disclosure generally relates is flexible rubber hoses for low, medium, or, particularly, high pressure applications, and more particularly to a construction there for, which is of a compact design.

BACKGROUND

This section provides background information to facilitate a better understanding of the various aspects of the disclosure. It should be understood that the statements in this section of this document are to be read in this light, and not as admissions of prior art.

Flexible rubber hose is used in a variety of hydraulic and other fluid transfer applications for conveying fluid pressures which for "high" pressure applications typically range from about 4000 psi (28 MPa) to 8000 psi (55 MPa) or more. In basic construction, hoses of the type herein involved typically are formed as having a tubular, inner tube or core surrounded by one or more outer layers of a braided or spiral-wound reinforcement material which may be a metal or metal-alloy wire or a natural or synthetic fiber. The reinforcement layers, in turn, are protected by a surrounding outermost jacket or cover which may be of the same or different material as the inner tube. The cover also provides the hose with increased abrasion resistance.

In the case of "rubber," as opposed to thermoplastic, hose constructions, the inner tube, may be provided as formed of a vulcanizable natural or, more typically, a synthetic rubber material such as Buna-N or neoprene. Such material or blend may be conventionally extruded and cooled or cured to form the inner tube. In some cases, the tube may be cross-head extruded over a mandrel for support, or otherwise supported in later forming operations using air pressure and/or reduced processing temperatures.

From the extruder, the inner tube may be delivered through a braider and/or a spiral winder for its reinforcement with one or more surrounding layers of a wire and/or fibrous material or blend such as a monofilament, yarn, cord, yarn-wire composite, or roving. Such reinforcement layers are often applied under tension and typically may be formed of an interwoven braid or a spiral winding of a nylon, polyester, polyphenylene bezobisoxazole, polyvinyl acetate, or aramid yarn, or a high tensile steel or other metal wire. A relatively thin bonding or other interlayer of a vulcanizable rubber may be extruded or otherwise applied between each of the reinforcement layers to bond each layer to the next layer.

Following the braiding, winding, or other application of the reinforcement layers and the interlayers, an outer cover or sheath optionally may be applied. Such cover, which may be formed as a cross-head extrusion, a moisture-cured or solvent-based dipped coating, or a spiral-wound wrapping, typically comprises an abrasion-resistant synthetic rubber or a thermoplastic such as a polyurethane. Following the application of the cover, the hose construction so-formed by be heated to vulcanize the rubber layers and thereby consolidate the construction into an integral hose structure.

In normal use, such as in mobile or industrial hydraulic applications, hoses of the type herein involved may be exposed to a variety of environmental factors and mechanical stresses which cannot always be predicted. Of utmost importance to the integrity and performance of the hose is that a strong bond is achieved between the constituent parts thereof. However, while it is important to bond these parts together, it is also important that the hose not be made overly stiff so as to make it prone to kinking or fatigue or otherwise useable for certain applications.

Current compact spiral hose designs use multiple layers of materials. The hose typically starts with a rubber inner tube, and a layer of textile braid or leno fabric covers the tube which prevents ends of wire from penetrating the tube during the spiral process. A rubber tie gum covers the textile braid or leno fabric to develop adhesion between the tube and the first layer of wire, and multiple layers of wire are spirally wound around the hose with rubber friction layers applied between each layer of wire. Finally the hose is covered by an outer layer of weather and abrasion resistant rubber. Hence, a conventional inner tube compound requires a textile braid or leno fabric to protect the soft uncured tube during the wire spiraling process. The textile braid or leno fabric prevents an end of wire from penetrating into the green tube during the spiral wire process. This protective layer is an expensive added cost and process to manufacture such hoses.

Hence, it is desirable to have hoses, which are manufactured in fewer steps, with fewer material, and which exhibit a demanding balance of chemical and physical properties. Indeed, as commercial applications for hoses continue to increase, it is believed that improvements in hose constructions would be well-received by numerous industries. Especially desired would be a construction which is flexible and light-weight, yet resistant to external stresses in a variety of mobile and industrial applications.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In a first aspect of the disclosure, a hose includes an inner tube defining a central longitudinal axis there through, and is formed of a vulcanized rubber and a plurality of rod shaped particles orientated substantially parallel with the central longitudinal axis, along with other typical materials. The inner tube has a tube wall thickness (t) of between about 0.5 mm to about 1.5 mm, and the plurality of rod shaped particles is incorporated in an amount of 10% or less by weight, based upon total weight of the inner tube, or even in an amount of from 1% to 7% by weight, based upon total weight of the inner tube. The hose further includes a tie layer directly surrounding the inner tube, a first reinforcement layer surrounding the tie layer, and at least a second reinforcement layer surrounding the first reinforcement layer. An interlayer is interposed between the first and the second reinforcement layer, and the interlayer bonds the first reinforcement layer to the second reinforcement layer. An outside cover surrounds the second reinforcement layer, as well as any additional layers.

In some aspects, the hose has a wall thickness (T), and the tube wall thickness t comprises less than about 25% of the hose wall thickness. In some cases, the vulcanized rubber comprises an acrylonitrile butadiene rubber (NBR), a hydrogenated NBR (HNBR), a cross-linked NBR (XNBR), or copolymers and blends thereof. The rubber forming the inner tube may a modulus of at least about 1100 psi and a tensile strength of at least about 2900 psi.

In some aspects, each of the first and the second reinforcement layers are spiral wound. The first reinforcement layer may be spiral wound in a first winding direction, and the second reinforcement layer spiral may be wound in a second winding direction opposite the first winding direction. In some cases, the first reinforcement layer is laid at a positive angle relative to the longitudinal axis, and the second reinforcement layer laid at a negative angle relative to the longitudinal axis. The angle of one of the first and the second reinforcement layer may be between about 45° and 65°, and the angle of the other one of the first and the second reinforcement layer between about −45° and −65°. The first reinforcement layer may comprise one or more filaments of a first metal or metal alloy wire, and the second reinforcement layer lines comprise one or more filaments of a second metal or metal alloy wire fiber, the same as or different than the first metal or metal alloy wire.

In some cases, the hose has an inner diameter defined by the inner tube, and wherein the inner diameter is between from about 6 mm to about 51 mm, and the hose may be rated for a service pressure of from about 28 MPa to about 55 MPa.

The plurality of rod shaped particles may be selected from of or more of carbon particles, aramid particles, and liquid crystalline polymer particles, and the particles comprised in the plurality of rod shaped particles may have an average length of from about 1.5 mm to about 5 mm, and an average diameter of from about 5 to about 7 microns.

In another aspect of the disclosure, a hose includes an inner tube defining a central longitudinal axis there through, and is formed of a vulcanized rubber and a plurality of rod shaped particles orientated substantially parallel with the central longitudinal axis, along with other typical materials. The plurality of rod shaped particles is incorporated in an amount of 10% or less by weight, based upon total weight of the inner tube, where particles comprised in the plurality of rod shaped particles have an average length of from about 1.5 mm to about 5 mm, and an average diameter of from about 5 to about 7 microns. The hose further includes a tie layer directly surrounding the inner tube, a first reinforcement layer surrounding the tie layer, and at least a second reinforcement layer surrounding the first reinforcement layer. An interlayer is interposed between the first and the second reinforcement layer, and the interlayer bonds the first reinforcement layer to the second reinforcement layer. An outside cover surrounds the second reinforcement layer, as well as any additional layers. The axial modulus of the inner tube may be greater than modulus of the inner tube in a perpendicular direction to the central longitudinal axis.

The plurality of rod shaped particles may be selected from of or more of carbon particles, aramid particles, and liquid crystalline polymer particles. The vulcanized rubber may comprise an acrylonitrile butadiene rubber (NBR), a hydrogenated NBR (HNBR), a cross-linked NBR (XNBR), or copolymers and blends thereof.

In yet another aspect of the disclosure, a hose includes an inner tube defining a central longitudinal axis there through, and comprising a vulcanized hydrogenated acrylonitrile butadiene rubber and a plurality of rod shaped particles orientated substantially parallel with the central longitudinal axis, along with other typical materials. The plurality of rod shaped particles is incorporated in an amount of 10% or less by weight, based upon total weight of the inner tube. The hose further includes a tie layer directly surrounding the inner tube, a first reinforcement layer surrounding the tie layer, and at least a second reinforcement layer surrounding the first reinforcement layer. An interlayer is interposed between the first and the second reinforcement layer, and the interlayer bonds the first reinforcement layer to the second reinforcement layer. An outside cover surrounds the second reinforcement layer, as well as any additional layers. The plurality of rod shaped particles may be selected from of or more of carbon particles, aramid particles, and liquid crystalline polymer particles. The particles comprised in the plurality of rod shaped particles may have an average length of from about 1.5 mm to about 5 mm, and an average diameter of from about 5 to about 7 microns.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
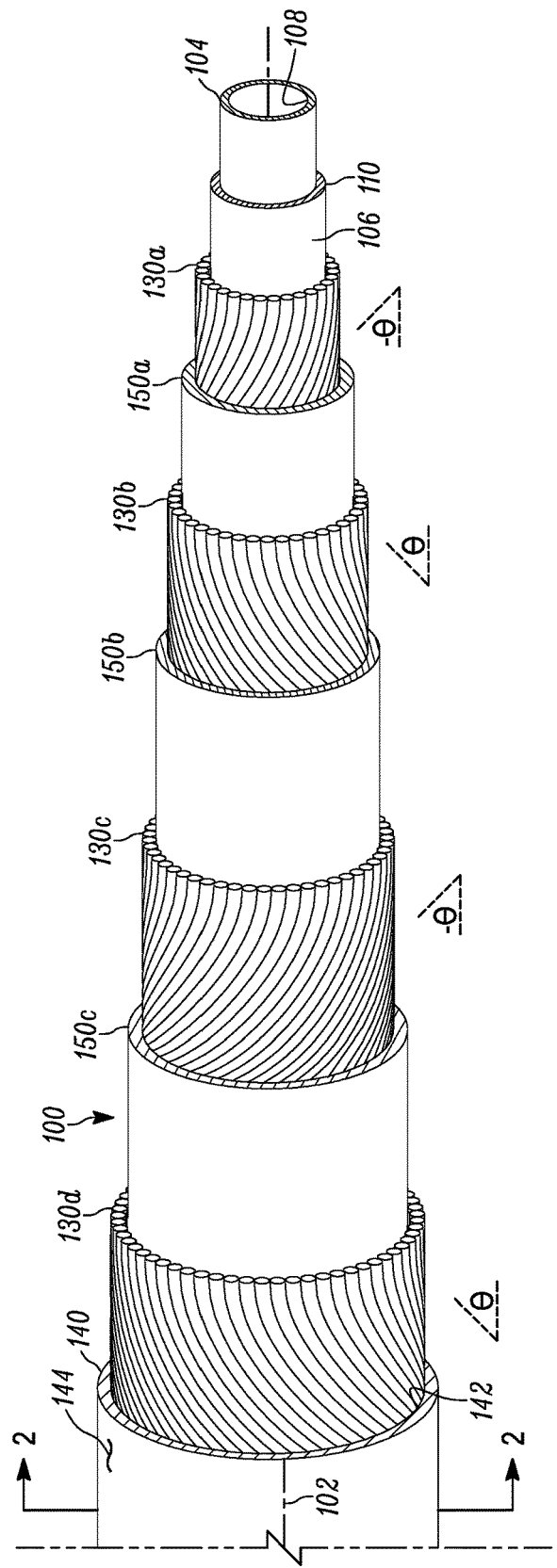
FIG. 1 illustrates in perspective view, a hose according to some aspects of the disclosure; and, FIG. 2 depicts in a cross sectional view of the hose illustrated in FIG. 2, in accordance with some aspects of the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount or value range listed or described as being useful, suitable, or the like, is intended that any and every concentration or amount or value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

For illustration purposes, the precepts of the compact rubber hose construction herein involved are described in connection with a configuration as particularly adapted for use in high pressure, i.e., between about 4000-8000 psi (28-55 MPa) mobile or industrial hydraulic applications. It will be appreciated, however, that aspects of the present disclosure may find use in other hose constructions for a variety or general hydraulic or other fluid transfer applications. Use within those such other applications therefore should be considered to be expressly within the scope of this disclosure.

Figure 2:
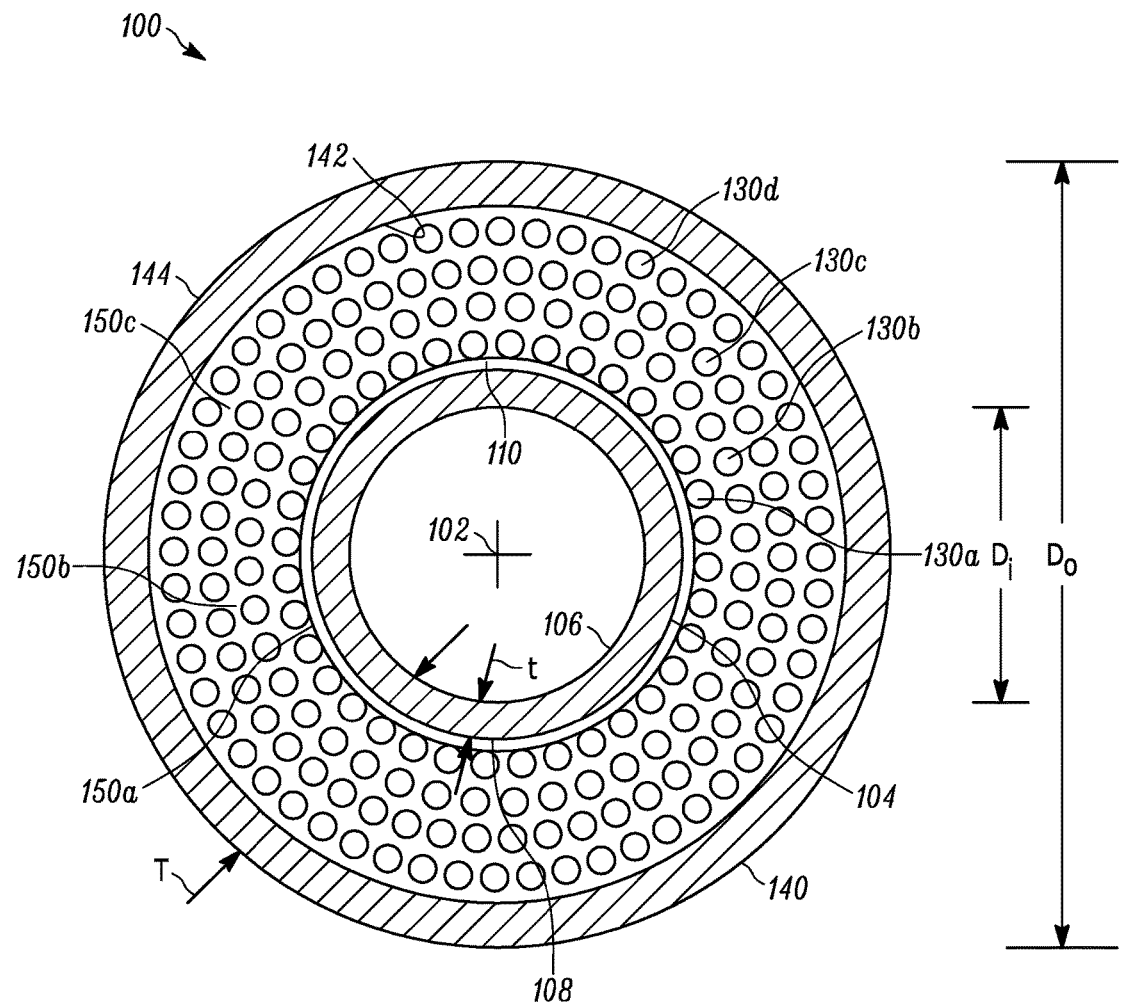

Referring now to the figures wherein corresponding reference characters are used to designate corresponding elements throughout the several views with equivalent elements being referenced with prime or sequential alphanumeric designations, a representative hose construction according to the disclosure is shown generally at 100 in the cut-away view of FIG. 1 and in the radial cross-sectional view of FIG. 2. In basic dimensions, hose 100 extends axially to an indefinite length along a central longitudinal axis 102, and has a select inner and outer diameter referenced, respectively, at "Di" and "Do" in the radial cross-sectional view of FIG. 2. The inner and outer diameter dimensions may vary depending upon the particular fluid conveying application involved, but generally for many high pressure hydraulic applications will be between about 0.25-2 inch (6-51 mm) for inner diameter Di, and about 0.5-3 inch (13-76 mm) for outer diameter Do, with an overall wall thickness, "T," there between of from about 0.12 to about 0.5 inch (3-13 mm).

As may be seen in the different views of FIGS. 1 and 2, hose 100 is constructed as being formed about a tubular inner layer, i.e., inner tube or core, 104, which may be of a single or multi-layer construction, and generally includes a vulcanized rubber. In either construction, inner tube 104 has a circumferential outer core tube surface, 106, and a circumferential inner core tube surface, 108, which defines the inner diameter Di of the hose 100. A wall thickness is defined between the outer and inner core tube surfaces 106 and 108, as referenced at "t" in the cross-sectional view of FIG. 2. Such thickness t, which may be between about 0.02-0.05 inch (0.5-1.25 mm), may be the minimum necessary to provide the desired pressure rating and solvent, gas, and/or liquid permeation resistance. With the overall wall thickness T of hose 100 being, as mentioned, between about 0.12-0.5 inch (3-13 mm) for many sizes of hose 100, the tube wall thickness t thus may comprises less than about 25% of that thickness T, with the balance being comprised of the reinforcement and bonding layers, and any cover, that are necessary for the hose to meet a size, desired pressure rating, and/or applicable industrial standard. Disposed over inner tube 104 is tie layer 110 surrounding the inner tube 104.

Inner tube or core, 104, further includes plurality of rod shaped particles entrained therein, and which are orientated substantially parallel with the central longitudinal axis 102 of the inner tube 104. In some aspects, the plurality of rod shaped particles is incorporated in an amount of 10% or less by weight, based upon total weight of the inner tube, or even incorporated in an amount of from 1% to 7% by weight, based upon total weight of the inner tube. The rod shaped particles may, in some cases, have an average length of from about 1.5 mm to about 5 mm, and an average diameter of from about 5 to about 7 microns. However, any suitable dimensions of the rod shaped particles are within the spirit and scope of the disclosure.

Materials forming the rod shaped particles may be selected from materials which provide a substantial increase in material modulus properties, when compared to an inner tube which has no such rod shaped particles. Some non limiting examples of such rod shaped particles include, but not limited to, carbon or graphite particles, polyaramid particles, liquid crystal polymer based particles, and the like. Carbon or graphite particles have carbon atoms which are bonded together in crystals that are more or less aligned parallel to the long axis of the rod shaped particle, as the crystal alignment gives the particle high strength-to-volume ratio (making it strong for its size). The properties of carbon particles, such as high stiffness, high tensile strength, low weight, high chemical resistance, high temperature tolerance and low thermal expansion, provide benefits in both manufacturing some hose embodiments according to the disclosure, as well as performance of such hoses.

A non limiting example of a liquid crystal polymer (LCP) material is Vectran®, available from Kuraray Co., Ltd, which is an aromatic polyester produced by the polycondensation of 4-hydroxybenzoic acid and 6-hydroxynaphthalene-2-carboxylic acid. The condensation product is a polyester/polyarylate having the following structure:

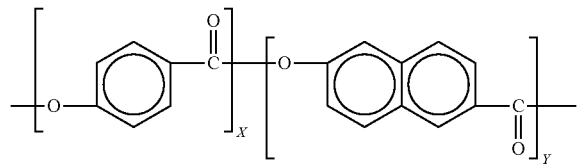

The materials used in the composition of inner tube 104 resists repeated high pressure impulse cycles and securely seals against a fitting, even though the tube wall gauge is thin. Furthermore, in manufacturing, the green strength, before vulcanization, of the tube is sufficient enough to allow spiraling wire reinforcement directly over the inner tube 104, without the requirement of a protecting layer of textile braid or leno fabric. However, in some cases, it may be desirable to use a textile braid or leno fabric disposed over the outer surface 106 of the inner tube.

In an aspect of the disclosure, carbon rod shaped particles mixed with HNBR tube compound is effective to increase green strength and allow spiral wire processing without the use of a protective layer of textile braid or leno fabric. When the HNBR rubber compound is extruded into the shape of the tube, the rod shaped particles at least substantially align longitudinally along the length (i.e. central longitudinal axis) of the tube. This produces very high tensile and modulus properties in the extruded direction, which is along the central longitudinal axis. These properties reduce tube deformation under high pressure impulse cycles which prevents pinholes in the tube and extends the life of the hose. The high longitudinal strength also better holds the fitting onto the end of the hose for longer assembly life.

Due to the unique properties of the rod shaped particles, only a small amount of such particles is needed to gain sufficient green strength for processing. As such, the extra process of braiding textile yarn or applying leno fabric over the tube as a protective layer is not required in some embodiments. The amount of rod shaped particles may be any suitable amount, including about 10% or less by weight, based upon total weight of the inner tube, or even incorporated in an amount of from 1% to 7% by weight, based upon total weight of the inner tube.

While the embodiments illustrated in FIGS. 1 and 2 depict a compact high pressure hose, any hose application which requires high green strength for processing and high modulus after vulcanizing will benefit from adding rod shaped particles to the compound, and such is within the scope of the disclosure.

Referring again to FIGS. 1 and 2, as may be seen in the different views, hose 100 is constructed as being formed about a tubular inner layer, i.e., inner tube or core, 104, which may be of a single or multi-layer construction. In either construction, inner tube 104 has a circumferential outer core tube surface, 106, and a circumferential inner core tube surface, 108, which defines the inner diameter Di of the hose 10. A wall thickness is defined between the outer and inner core tube surfaces 106 and 108, as referenced at "t" in the cross-sectional view of FIG. 2. Such thickness t, which may be between about 0.02-0.05 inch (0.5-1.25 mm), may be the minimum necessary to provide the desired pressure rating and solvent, gas, and/or liquid permeation resistance. With the overall wall thickness T of hose 100 being, as mentioned, between about 0.12-0.5 inch (3-13 mm) for many sizes of hose 100, the tube wall thickness t thus may comprises less than about 25% of that thickness T, with the balance being comprised of the reinforcement and bonding layers, and any cover, that are necessary for the hose to meet a size, desired pressure rating, and/or applicable industrial standard.

Inner tube 104 may be provided as extruded or otherwise formed of a vulcanizable, chemically-resistant, synthetic rubber. As used herein, "chemical resistance" should be understood to mean the ability to resist swelling, crazing, stress cracking, corrosion, or otherwise to withstand attack from organic solvents and hydrocarbons, such as hydraulic fluids. Suitable materials include acrylonitrile butadiene rubbers (NBR) and modified NBR's such as hydrogenated NBR (HNBR) and cross-linked NBR (XNBR), as well as copolymers and blends, thereof. Such blends may be, for example, XNBR or HNBR blended with one or more of a chlorinated polyethylene (CPE), polyvinyl chloride (PVC), or polychloroprene (CR).

In its raw, i.e., uncompounded, form, the NBR may have a mid to high acrylonitrile (ACN) content of between about 19-36%, and a Mooney viscosity ((ML 1+4)@212° F. (100° C.)) of at least about 90. Such viscosity allows the rubber material to be compounded with between about 15-66% by total weight of the compound of one or more reinforcing fillers. Each of such fillers may be provided, independently, as a powder or as flakes, fibers, or other particulate form, or as a mixture of such forms. Typical of such reinforcing fillers include carbon blacks, clays, and pulp fibers. For powders, the mean average particle size of the filler, which may be a diameter, imputed diameter, screen, mesh, length, or other dimension of the particulate, may range between about 10-500 nm.

Additional fillers and additives may be included in the formulation of the rubber compound depending upon the requirements of the particular application envisioned. Such fillers and additives, which may be functional or inert, may include curing agents or systems, wetting agents or surfactants, plasticizers, processing oils, pigments, dispersants, dyes, and other colorants, opacifying agents, foaming or anti-foaming agents, anti-static agents, coupling agents such as titanates, chain extending oils, tackifiers, flow modifiers, pigments, lubricants, silanes, and other agents, stabilizers, emulsifiers, antioxidants, thickeners, and/or flame retardants. The formulation of the material may be compounded in a conventional mixing apparatus as an admixture of the rubber and filler components, and any additional fillers or additives. As vulcanized and filled with between about 15-66% of a carbon black filler.

With respect to the spiral-wound construction shown in FIGS. 1 and 2, at least two, and typically four (as shown) or up to six or more, reinforcement layers, 130a-d, are provided over the inner tube 104. Each of the reinforcement layers 130 may be conventionally formed as braided, knitted, wrapped, or, as is shown, spiral, i.e., helically, wound of, for example, from 1 to about 180 ends of monofilament, continuous multi-filament, i.e., yarn, stranded, cord, roving, thread, tape, or ply, or short "staple" strands of a fiber material. The fiber material, which may be the same or different in layers 130a-d, may be a natural or synthetic polymeric material such as a nylon, cotton, polyester, polyamide, aramid, polyolefin, polyvinyl alcohol (PVA), polyvinyl acetate, or polyphenylene bezobisoxazole (PBO), or blend, a steel, which may be stainless or galvanized, brass, zinc or zinc-plated, or other metal wire, or a blend thereof.

In the illustrated spiral wound construction 10 of FIGS. 1 and 2, which also may contain additional extruded, spiral, braided, and/or knitted layers (not shown), the reinforcement layers 130a-d are oppositely wound in pairs so as to counterbalance torsional twisting effects. For each of the spiral wound layers 130a-d, from 1 to about 180 parallel ends of, preferably, a monofilament metal or metal alloy wire, may be helically wound under tension in one direction, i.e., either left or right hand, with the next immediately succeeding layer 130 being wound in the opposite direction. The inner reinforcement layer 130a may be wound as is shown in FIG. 1 directly over the outer surface 106 of inner tube 104, or over an intermediate textile, foil, film, tie layer, or other layer.

As successively wound in the hose 100, the layers 130a-d each may have a predetermined pitched angle, referenced at $-\theta$ in FIG. 1 for layers 130a and 130c, and at for layers 130b and 130d, measured relative to the longitudinal axis 12 of the hose 100. For typical applications, the pitch angle $\theta$ will be selected to be between about 45-65°, but particularly may be selected depending upon the desired convergence of strength, elongation, weight, and volumetric expansion characteristics of hose 100. In general, higher pitch angles above about 54.7° exhibit decreased radial expansion of the hose under pressure, but increased axial elongation. For high pressure applications, a "neutral" pitch angle of about 54.7° generally is preferred as minimizing elongation to about ±3% of the original hose length. Each of the layers 130 may be wound at the same or different absolute pitch angle, and it is known that the pitch angles of respective reinforcement layers may be varied to affect the physical properties of the hose. In a preferred construction, however, the pitch angles of reinforcement layers 130a-d are provided to about the same, but as reversed in successive layers.

The tension and area coverage at which the reinforcement layers 130 are braided, wound, or knitted may be varied to achieve the desired flexibility, which may be measured by bend radius, flexural forces, or the like, of the hose 100. For the spiral wound layers 130a-d depicted in FIGS. 1 and 2, the constituent wires or other ends generally will be applied at greater than about 70% coverage.

In the illustrated construction which may be particularly adapted for high pressure hydraulic applications, each of the reinforcement layers 130a-d may be spiral wound from one end of a monofilament carbon or stainless steel wire having a generally circular cross-section with a diameter of between about 0.008-0.04 inch (0.2-1 mm). As so formed, each of the layers 130a-d thus may have a thickness of that of the wire diameter. Although a circular wire is shown, a "flat-wire" construction alternatively may be employed using wires having a rectangular, square, or other polygonal cross-section. Low profile oval or elliptical wires also may be used. To better control the elongation and contraction of hose 100, and for improved impulse fatigue life, the inner reinforcement layer 130a may be bonded, by means of fusion, i.e., vulcanization of the inner tube 104, mechanical, chemical, or adhesive bonding, or a combination thereof or otherwise, to the outer surface 106 of the core tube 104. In some aspects, such bonding is achieved with a tie layer 110 disposed between reinforcement layer 130a and outer surface 106 of inner tube 104.

In those embodiments where tie layer 110 is disposed between reinforcement layer 130a and outer surface 106 of inner tube 104, tie layer 110 may be formed of one or more bonding resins which is be provided between reinforcement layer 130a and outer surface 106 to effect a bond across the entirety of these layers. Representative examples of such resins include Ricobond® 1756 for peroxide cured compounds and Ricobond® 1731 for sulfur cured compounds.

In some aspects, the outermost reinforcement layer 130 d may be sheathed within one or more layers of a coaxially-surrounding protective cover or jacket, referenced at 140, having a circumferential interior surface, 142, and an opposing circumferential exterior surface, 144, which defines the hose outer diameter Do. Depending upon its construction, cover 140 may be spray-applied, dip coated, cross-head or co-extruded, or otherwise conventionally extruded, spiral or longitudinally, i.e., "cigarette," wrapped, or braided over the reinforcement layer 130d as, for example, a 0.02-0.15 inch (0.5-3.8 mm) thick layer of an fiber, glass, ceramic, or metal-filled, or unfilled, abrasion-resistant thermoplastic, i.e., melt-processable, or thermosetting, vulcanizable natural rubber or a synthetic rubber such as fluoropolymer, chlorosulfonate, polybutadiene, butyl, neoprene, nitrile, polyisoprene, and buna-N, copolymer rubbers such as ethylene-propylene (EPR), ethylene-propylene-diene monomer (EPDM), nitrile-butadiene (NBR) and styrene-butadiene (SBR), or blends such as ethylene or propylene-EPDM, EPR, or NBR, and copolymers and blends of any of the foregoing. The term "synthetic rubbers" also should be understood to encompass materials which alternatively may be classified broadly as thermoplastic or thermosetting elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyesters, ethylene vinyl acetates, and polyvinyl chlorides. As used herein, the term "elastomeric" is ascribed its conventional meaning of exhibiting rubber-like properties of compliancy, resiliency or compression deflection, low compression set, flexibility, and an ability to recover after deformation, i.e., stress relaxation. By "abrasion-resistant," it is meant that such material for forming cover 140 may have a hardness of between about 60-98 Shore A durometer.

Any of the materials forming the cover 140 may be loaded with metal particles, carbon black, or another electrically-conductive particulate, flake, or fiber filler so as to render hose 100 electrically-conductive for static dissipation or other applications. Separate electrically-conductive fiber or resin layers (not shown), which may be in the form of spiral or "cigarette-wrapped" tapes or otherwise provided, also may be included in the hose construction 100 between the core 104 and the inner reinforcement layer 130a, between the reinforcement layers 130, or between the outermost reinforcement layer 130d and cover 140.

Similar to the bonding of core 104 to the inner reinforcement layer 130a, or to a textile or other layer there between, the interior surface 142 of cover 140 may be bonded to the outermost reinforcement layer 130d. Such bond, again, may be by fusion, chemical, mechanical, or adhesive means, or a combination thereof or other means.

Each of the reinforcement layers 130a-d within hose 100 may be bonded, such as chemically and/or mechanically, to its immediately succeeding layer 130 so as to provide for the more efficient transfer of induced internal or external stresses. Such bonding may be effected via the provision of a bonding agent in the form of an intermediate adhesive, resin, or other interlayer, 150a-c. In an illustrative embodiment, such bonding agent may be provided as an adhesive in the form of a melt-processable or vulcanizable material which is extruded or otherwise applied in a molten, softened, uncured or partially uncured, or otherwise flowable phase over each of the reinforcement layers 130a-d to form the respective interlayers 150a-c. Each such interlayer 150 may have a thickness of between about 1-25 mils (0.025-0.64 mm). The corresponding reinforcement layer 130 then may be wound over the corresponding interlayer 150 while it is still in its softened phase. Alternatively in the case of a thermoplastic interlayer 150, the layer may be reheated to effect its re-softening prior to the winding of reinforcement layer 130.

The material forming interlayers 150 specifically may be selected for high or low temperature performance, flexibility, or otherwise for compatibility with the reinforcement layers 130 and/or the inner tube 104 and cover 140. Suitable materials include natural and synthetic rubbers, as well as thermoplastic, i.e., melt-processable, or thermosetting, i.e., vulcanizable, resins which should be understood to also include, broadly, materials which may be classified as elastomers or hot-melts. Representative of such resins include plasticized or unplasticized polyamides such as nylon 6, 66, 11 and 12, polyesters, copolyesters, ethylene vinyl acetates, ethylene terpolymers, polybutylene or polyethylene terephthalates, polyvinyl chlorides, polyolefins, fluoropolymers, thermoplastic elastomers, engineering thermoplastic vulcanizates, thermoplastic hot-melts, copolymer rubbers, blends such as ethylene or propylene-EPDM, EPR, or NBR, polyurethanes, and silicones. In the case of thermoplastic resins, such resins typically will exhibit softening or melting points, i.e., Vicat temperatures, of between about 77-250° C. For amorphous or other thermoplastic resins not having a clearly defined melting peak, the term melting point also is used interchangeably with glass transition point.

With each of the respective layers 104, optional tie layer 110, 130a, 150a, 130b, 150b, 130c, 150c, 130d, and 140 being extruded, wound, or otherwise formed sequentially in such order, following the application of the cover 140, the hose 100 may be heated to vulcanize the rubber layers and thereby consolidate the construction into an integral hose structure.

Thus, an illustrative rubber hose construction is described which is of most compact design, but which is still flexible. Such construction may be rated, such as under SAE J517 or J1754, ISO 3862 or J1745, and/or DIN EN 856, or otherwise adapted for use in a variety applications such as mobile or industrial hydraulic installations specifying relatively high working pressures of between about 4000-8000 psi (28-55 MPa), or otherwise for a variety of pneumatic, vacuum, shop air, general industrial, maintenance, and automotive applications such as for air, oil, antifreeze, and fuel.

This unique compound design could be used in high pressure oil drilling applications such as chock and kill hose or rotary drilling hose. It also could be used in high pressure compact braided hydraulic hose. In this invention, carbon fiber is added to an HNBR compound but other types of fiber and polymer combinations could be formulated for different hose applications.

EXAMPLES

The following experimental data was generated for the purpose of further illustrating the nature of some of the embodiments and aspects of the disclosure, and are not intended as a limitation on the scope thereof. The following examples were prepared to illustrate improved inner tube properties for manufacturing and high performance hoses, in accordance with some aspects of the disclosure.

In the following examples, in a first pass, a non-productive blend of components was mixed in an internal mixer as indicated in table 1. The non-productive batch was dropped at a temperature of from about 280 deg F. to about 290 deg F. Thereafter, in a second pass, additional components were added to non-productive blend to form a product blend by mixing in an internal mixer. The productive batch was dropped at a temperature of from about 210 deg F. to about 230 deg F. Ingredients used for these examples, ex. 1 through ex. 8, are provided in table 1. Thereafter are provided descriptions/availability of ingredients used in the compounding of the non-productive and productive blends.

The productive blends were then formed into 2 mm thick sheets, and either tested in 'green' form, uncured form, for green strength, or cured at temperature of about 320 deg F. for 30 minutes. Physical property testing was conducted on the cured example sheets or uncured examples, with values indicated in tables 2 and 3 below. Any evaluation conducted "with the grain" means the evaluation was carried out with stress or forces applied in a direction parallel with the orientation of the plurality of rod shaped particles. The evaluations for tensile (psi), elongation %, Mod 5 (psi), Mod 10 (psi), Mod 25 (psi), Mod 50 (psi) and Mod 100 (psi) were conducted according to ASTM D412. Shore A was conducted according to ASTM D2240, Tear Die C (lbf/in) according to ASTM D624, Volume swell % according to ASTM D471, and Hydraulic Oil Tellus 46 according to ASTM D471.

TABLE 1

| Ingredient | Ex. 1 | Ex. 2 | Ex. 3 | Ex. 4 | Ex. 5 | Ex. 6 | Ex. 7 | Ex. 8 |
|---|---|---|---|---|---|---|---|---|
| - Non-productive Blend - | | | | | | | | |
| Hydrogenated NBR A[1] | 0 | 0 | 0 | 100 | 100 | 35 | 35 | 0 |
| Hydrogenated NBR B[2] | 0 | 0 | 0 | 0 | 0 | 25 | 25 | 0 |
| Hydrogenated NBR C[3] | 60 | 60 | 60 | 0 | 0 | 0 | 0 | 60 |
| Hydrogenated NBR D[4] | 40 | 40 | 40 | 0 | 0 | 0 | 0 | 40 |
| Hydrogenated NBR E[5] | 0 | 0 | 0 | 0 | 0 | 40 | 40 | 0 |
| Acetylene carbon black | 30 | 30 | 30 | 0 | 0 | 0 | 0 | 30 |
| N550 carbon black | 0 | 0 | 0 | 80 | 0 | 0 | 0 | 0 |
| SR401 carbon black | 0 | 0 | 0 | 0 | 70 | 35 | 35 | 0 |
| Carbon Rod Shaped Particles[6] | 0 | 5 | 10 | 0 | 3.7 | 5 | 5 | 5 |
| Trimethylolproprane trimethacrylate | 2.78 | 2.78 | 2.78 | 0 | 0 | 0 | 0 | 2.78 |
| Antioxidant A[7] | 1 | 1 | 1 | 1 | 1 | 1 | 1 | 1 |
| Antioxidant B[8] | 1 | 1 | 1 | 0 | 0 | 0 | 0 | 1 |
| Antioxidant C[9] | 0 | 0 | 0 | 1.5 | 1.5 | 1.5 | 1.5 | 0 |
| Antioxidant D[10] | 0 | 0 | 0 | 1.5 | 1.5 | 0 | 0 | 0 |
| Stearic acid | 0 | 0 | 0 | 0.5 | 0.5 | 0 | 0 | 0 |
| Zinc Oxide | 0 | 0 | 0 | 3 | 3 | 5 | 5 | 0 |
| Plasticizer A[11] | 0 | 0 | 0 | 10 | 10 | 5 | 5 | 0 |
| Plasticizer B[12] | 0 | 0 | 0 | 10 | 10 | 0 | 0 | 0 |
| Plasticizer C[13] | 0 | 0 | 0 | 0 | 0 | 0 | 12.5 | 12.5 |
| - Productive Blend - | | | | | | | | |
| Accelerator A[14] | 3.1 | 3.1 | 3.1 | 0 | 0 | 0 | 0 | 3.1 |
| Crosslinking peroxide[15] | 0 | 0 | 0 | 0 | 0 | 5.5 | 5.5 | 0 |
| Accelerator B[16] | 0 | 0 | 0 | 1 | 1 | 0 | 0 | 0 |
| Accelerator C[17] | 0 | 0 | 0 | 2 | 2 | 0 | 0 | 0 |
| Accelerator D[18] | 0 | 0 | 0 | 0 | 0 | 0 | 0 | 0.1 |
| Sulfur[19] | 0 | 0 | 0 | 0.75 | 0.75 | 0 | 0 | 0.1 |

TABLE 1-continued

| Ingredient | Ex. 1 | Ex. 2 | Ex. 3 | Ex. 4 | Ex. 5 | Ex. 6 | Ex. 7 | Ex. 8 |
|---|---|---|---|---|---|---|---|---|
| Plasticizer D[20] | 0 | 0 | 0 | 10 | 10 | 0 | 0 | 0 |
| Plasticizer C[13] | 0 | 0 | 0 | 0 | 0 | 12 | 0 | 0 |

[1]Zetpol 2030L available from Zeon Chemicals L.P.
[2]Zetpol 2020EP available from Zeon Chemicals L.P.
[3]Zetpol 2010L available from Zeon Chemicals L.P.
[4]Zeoforte ZSC 2295 available from Zeon Chemicals L.P.
[5]Zeoforte ZSC 2395 available from Zeon Chemicals L.P.
[6]Particles sized to 1.5 mm to 5 mm in length, and a diameter of 5 to 7 microns, from TORAYCA ™ polyacrylonitrile-based carbon materials
[7]VANOX ® ZMTI available from Vanderbilt Chemicals, LLC.
[8]AGERITE ® Resin D ® available from Vanderbilt Chemicals, LLC.
[9]Oxoflex ® DPA available from Sovereign Chemical Company
[10]Vulkanox ® 4010 NA/LG available from LANXESS Corporation
[11]TOTM Plasticizer available from Eastman ™
[12]DUREZ 12687 available from SUMITOMO BAKELITE CO., LTD.
[13]Ricobond 1756HS available from Total Cray Valley
[14]Rhenocure EF(DBDB)-60 available from Rhein Chemie
[15]Vulcup 40C-SP2 available from Arkema Inc.
[16]TMTM available from Akrochem Corp.
[17]OBTS available from Akrochem Corp.
[18]DCBS available from Akrochem Corp.
[19]MC-98 sulfur available from Akrochem Corp.
[20]Ricobond 1756HS available from Total Cray Valley

TABLE 2

| Testing Evaluation | Guideline | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Original Properties (with the grain) | | | | | | | | | |
| Tensile (psi) | >=2900 | 3622 | 2762 | 3052 | 2847 | 3197 | 3774 | 3248 | 3342 |
| Elongation, % | >=180% | 426 | 322 | 54 | 329 | 285 | 204 | 236 | 192 |
| Mod 100 (psi) | >=2175 | 1108 | 2439 | na | 1422 | 1782 | 2236 | 1826 | 2386 |
| Shore A | | 78 | 82 | 85 | 85 | 89 | 86 | 86 | 92 |
| Specific gravity | | 1.1659 | 1.1768 | 1.1895 | 1.2471 | 1.2325 | 1.2241 | 1.1256 | 1.1797 |
| Original Properties after 30 min/121 C. pre-heat | | | | | | | | | |
| Tensile (psi) | | 1301 | 1406 | 1097 | 1561 | 1689 | 1432 | 1266 | 1530 |
| Elongation, % | | 232 | 185 | 154 | 172 | 162 | 89 | 106 | 114 |
| Mod 100 (psi) | | 653 | 993 | 929 | 988 | 1111 | NA | 1028 | 1417 |
| Shore A | | 75 | 81 | 82 | 81 | 85 | 86 | 83 | 88 |
| Tear Die C (lbf/in) | >=200 | 291 | 361 | 388 | 247 | 291 | 264 | 264 | 309 |
| Tear Die C (lbf/in) after 30 min/121 C. pre-heat | | 130 | 169 | 218 | 118 | 149 | 137 | 113 | 149 |
| Air Oven Age (168H @ 121 C.) | | | | | | | | | |
| Tensile (psi) | | 4047 | 2997 | 3516 | 2931 | 2957 | 3812 | 3217 | 3295 |
| Elongation, % | >=110 | 346 | 62 | 39 | 166 | 83 | 141 | 110 | 92 |
| Mod 100 (psi) | | 1517 | 2962 | | 2278 | na | 3044 | 3017 | NA |
| Shore A | | 79 | 83 | 86 | 91 | 94 | 91 | 90 | 93 |
| IRM903 (168H @100 C.) | | | | | | | | | |
| Tensile (psi) | | 3816 | 2557 | 2864 | 2864 | 3039 | 2705 | 3035 | 3313 |
| Elongation, % | | 416 | 185 | 50 | 251 | 203 | 128 | 168 | 186 |
| Mod 100 (psi) | | 1012 | 2408 | | 1713 | 2163 | 2263 | 2091 | 2297 |
| Shore A | | 74 | 80 | 82 | 85 | 87 | 85 | 85 | 88 |
| Volume swell % | <40 | 12.91 | 12.21 | 12.48 | 5.66 | 5.82 | 6.84 | 6.36 | 10.95 |

TABLE 3

| Testing Evaluation | Guideline | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Hydraulic oil Tellus 46 (168H @121 C.) | | | | | | | | | |
| Tensile (psi) | | 3821 | 2833 | 3888 | 2852 | 2941 | 3514 | 3152 | 3360 |
| Elongation, % | | 325 | 171 | 43 | 154 | 104 | 152 | 137 | 142 |

TABLE 3-continued

| Testing Evaluation | Guideline | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Mod 100 (psi) | | 1369 | 2624 | | 2284 | 2934 | 2745 | 2754 | 2886 |
| Shore A | | 79 | 83 | 84 | 89 | 91 | 88 | 88 | 92 |
| Volume swell % | <=19 | 2.23 | 2.46 | 1.82 | −1.23 | −1.21 | −0.6 | −1.1 | 2.47 |
| Cold Temp flexibility −40 F. (−40 C.) | no break | no break | no break | no break | no break | no break | no break | no break | no break |
| Flexibility rating (1 = very flexible, 10 = break) | | 8 | 6 | 7 | 8 | 5 | 8 | 8 | 8 |
| Compound green strength (w/ grain direction) | | | | | | | | | |
| Tensile (psi) | 1094 | 832 | 652 | 790 | 258 | 482 | 411 | 331 | 934 |
| Elongation, % | 292 | 1008 | 813 | 78 | 293 | 30 | 37 | 39 | 608 |
| Shore A Hardness | 74 | 58 | 64 | 68 | 67 | 75 | 70 | 65 | 74 |
| Mod 5 (psi) | 245 | 78 | 185 | 273 | 114 | 269 | 221 | 190 | 286 |
| Mod 10 (psi) | 308 | 113 | 260 | 387 | 159 | 376 | 295 | 245 | 366 |
| Mod 25 (psi) | 362 | 157 | 386 | 598 | 209 | 480 | 397 | 317 | 452 |
| Mod 50 (psi) | 418 | 172 | 475 | 755 | 221 | 452 | 405 | 328 | 446 |
| Mod 100 (psi) | 571 | 177 | 508 | 771 | 225 | 392 | 358 | 290 | 431 |

The evaluations carried out for examples 1 through 8 showed increasing carbon rod shaped particles content resulted in increases in tensile, modulus, Shore A, and Tear Die C. Although the elongation decreased with higher carbon rod shaped particle loading, the materials still retained sufficient elongation to be flexible in dynamic performance. The unique combination of properties, made possible by incorporation of carbon rod shaped particles, is important to obtain the high dynamic performance of the hose. Besides improving dynamic performance, carbon rod shaped particles also make the uncured rubber processable during the spiraling step(s) of making a hose. In examples 1 through 3, the compound green strength increases as carbon rod shaped particle content percentage increases. It is also very important to notice that without any fiber the compound green strength is insufficient for processing. In examples 4 through 8, one can observe similar benefit on compound green strength by carbon rod shaped particle incorporation.

A compact spiral hose was prepared using the material of Ex. 8 above. The material of Ex. 8 was used to extrude an inner tube having a thickness of 1.20 mm+/−0.05 mm, and an inner diameter of 25.6 mm+/−0.06 mm. A leno fabric (polyester open weave RFL dipped material) was then applied over the inner tube, and tie layer applied over the leno fabric, where the tie layer had a thickness of 0.30 mm+/−0.05 mm. The tie layer was composed of a blend of NBR/SBR/BR polymer with a hydrated silica, resorcinol, and hexamethylenetetramine adhesion system. The tie layer was designed to have excellent adhesion to the HNBR tube on one side to an outer friction layer, described below.

A 0.56 mm brass coated wire spiral weave reinforcement layer was applied over the tie layer, and friction layer having a thickness of 0.30 mm+/−0.05 mm applied over the brass coated wire spiral weave reinforcement layer. The friction layer was a material composed of a SBR polymer with hydrated silica, resorcinol, and hexamethylenetetramine adhesion system. Five more layers of brass coated wire spiral weave reinforcement and friction material were subsequently applied, resulting in six brass coated wire spiral weave reinforcement layers with friction layers applied thereon. A XNBR cover having a thickness of 1.20 mm+/−0.05 mm was then extruded over the entire hose, which resulted in a compact spiraled hose having an outer diameter of 35.7 mm+/−0.5 mm.

The compact spiral hose was then subjected to repeated cycle pressure pulse testing by sealingly affixing the two ends of the hose, via a pair of fittings, to a pressure cycling device. The compact spiral hose was exposed to 1,000,000 pressure pulse cycles, each ramping up to about 47 MPa. The compact spiral hose maintained its structural integrity during the 1,000,000 pressure pulse cycles, and no failure of the hose was observed.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A hose comprising:
an inner tube of a single layer construction and defining a central longitudinal axis there through, and comprising a vulcanized rubber and a plurality of rod shaped particles orientated substantially parallel with the central longitudinal axis, wherein the inner tube has a tube wall thickness (t) of between about 0.5 mm to about 1.5 mm, wherein the plurality of rod shaped particles are carbon or graphite particles having carbon atoms which are bonded together in crystals aligned parallel to the long axis of each of the plurality of rod shaped particles, and wherein the plurality of rod shaped particles is incorporated in an amount of 5% or less by weight, based upon total weight of the inner tube;
a tie layer directly surrounding the inner tube;
a first reinforcement layer surrounding the tie layer;

at least a second reinforcement layer surrounding the first reinforcement layer;

an interlayer interposed between the first and the second reinforcement layer, the interlayer bonding the first reinforcement layer to the second reinforcement layer; and, a cover surrounding the second reinforcement layer.

2. The hose according to claim 1, wherein the hose has a wall thickness (T), and the tube wall thickness t comprises less than about 25% of the hose wall thickness.

3. The hose according to claim 1, wherein the vulcanized rubber comprises an acrylonitrile butadiene rubber (NBR), a hydrogenated NBR (HNBR), a cross-linked NBR (XNBR), or copolymers and blends thereof.

4. The hose according to claim 1, wherein the plurality of rod shaped particles is incorporated in an amount of from 1% to 4% by weight, based upon total weight of the inner tube.

5. The hose according to claim 1, wherein the rubber has a modulus of at about 12 MPa and a tensile strength of at least about 18 MPa.

6. The hose according to claim 1, wherein each of the first and the second reinforcement layers are spiral wound.

7. The hose according to claim 6, wherein:
the first reinforcement layer is spiral wound in a first winding direction; and
the second reinforcement layer is spiral wound in a second winding direction opposite the first winding direction.

8. The hose according to claim 7, wherein:
the first reinforcement layer is laid at a positive angle relative to the longitudinal axis; and,
the second reinforcement layer is laid at a negative angle relative to the longitudinal axis.

9. The hose according to claim 8, wherein:
the angle of one of the first and the second reinforcement layer is between about 45° and 65°; and
the angle of the other one of the first and the second reinforcement layer is between about −45° and −65°.

10. The hose according to claim 1, wherein:
the first reinforcement layer comprises one or more filaments of a first metal or metal alloy wire; and,
the second reinforcement layer lines comprise one or more filaments of a second metal or metal alloy wire fiber the same as or different than the first metal or metal alloy wire.

11. The hose according to claim 1, wherein the hose has an inner diameter defined by the inner tube, and wherein the inner diameter is between from about 6 mm to about 51 mm.

12. The hose according to claim 1, wherein the hose is rated for a service pressure of from about 28 MPa to about 55 MPa.

13. The hose according to claim 12, wherein the hose maintains structural integrity after subjected to 1,000,000 pressure pulse cycles at about 47 MPa.

14. The hose according to claim 1, wherein the plurality of rod shaped particles is selected from of or more of carbon particles, aramid particles, and liquid crystalline polymer particles.

15. The hose according to claim 1, wherein particles comprised in the plurality of rod shaped particles have an average length of from about 1.5 mm to about 5 mm, and an average diameter of from about 5 to about 7 microns.

16. A hose comprising:
an inner tube of a single layer construction and defining a central longitudinal axis there through, and comprising a vulcanized rubber and a plurality of rod shaped particles orientated substantially parallel with the central longitudinal axis, wherein the plurality of rod shaped particles are carbon or graphite particles having carbon atoms which are bonded together in crystals aligned parallel to the long axis of each of the plurality of rod shaped particles, wherein the plurality of rod shaped particles is incorporated in an amount of 5% or less by weight, based upon total weight of the inner tube, and wherein particles comprised in the plurality of rod shaped particles have an average length of from about 1.5 mm to about 5 mm, and an average diameter of from about 5 to about 7 microns;

a tie layer directly surrounding the inner tube;

a first reinforcement layer surrounding the tie layer;

at least a second reinforcement layer surrounding the first reinforcement layer;

an interlayer interposed between the first and the second reinforcement layer, the interlayer bonding the first reinforcement layer to the second reinforcement layer; and, a cover surrounding the second reinforcement layer;

wherein axial modulus of the inner tube is greater than a modulus of the inner tube in a perpendicular direction to the central longitudinal axis.

17. The hose according to claim 16, wherein the plurality of rod shaped particles is selected from of or more of carbon particles, aramid particles, and liquid crystalline polymer particles.

18. The hose according to claim 16, wherein the vulcanized rubber comprises an acrylonitrile butadiene rubber (NBR), a hydrogenated NBR (HNBR), a cross-linked NBR (XNBR), or copolymers and blends thereof.

19. A hose comprising:
an inner tube of a single layer construction and defining a central longitudinal axis there through, and comprising a vulcanized hydrogenated acrylonitrile butadiene rubber and a plurality of rod shaped particles orientated substantially parallel with the central longitudinal axis, wherein the plurality of rod shaped particles are carbon or graphite particles having carbon atoms which are bonded together in crystals aligned parallel to the long axis of each of the plurality of rod shaped particles, and wherein the plurality of rod shaped particles is incorporated in an amount of 5% or less by weight, based upon total weight of the inner tube;

a tie layer directly surrounding the inner tube;

a first reinforcement layer surrounding the tie layer;

at least a second reinforcement layer surrounding the first reinforcement layer;

an interlayer interposed between the first and the second reinforcement layer, the interlayer bonding the first reinforcement layer to the second reinforcement layer; and, a cover surrounding the second reinforcement layer.

20. The hose according to claim 19, wherein the plurality of rod shaped particles is selected from of or more of carbon particles, aramid particles, and liquid crystalline polymer particles.

21. The hose according to claim 19, wherein particles comprised in the plurality of rod shaped particles have an average length of from about 1.5 mm to about 5 mm, and an average diameter of from about 5 to about 7 microns.

* * * * *